(12) United States Patent
Rigazio et al.

(10) Patent No.: US 8,031,175 B2
(45) Date of Patent: Oct. 4, 2011

(54) TOUCH SENSITIVE REMOTE CONTROL SYSTEM THAT DETECTS HAND SIZE CHARACTERISTICS OF USER AND ADAPTS MAPPING TO SCREEN DISPLAY

(75) Inventors: Luca Rigazio, Santa Barbara, CA (US);
David Kryze, Santa Barbara, CA (US);
Philippe Morin, Goleta, CA (US);
Masaki Yamauchi, Mountain View, CA (US)

(73) Assignee: Panasonic Corporation, Osaka (JP)

( * ) Notice: Subject to any disclaimer, the term of this patent is extended or adjusted under 35 U.S.C. 154(b) by 600 days.

(21) Appl. No.: 12/235,862

(22) Filed: Sep. 23, 2008

(65) Prior Publication Data

US 2009/0262073 A1   Oct. 22, 2009

Related U.S. Application Data

(60) Provisional application No. 61/046,578, filed on Apr. 21, 2008.

(51) Int. Cl.
*G09G 5/08* (2006.01)

(52) U.S. Cl. ..... 345/158; 345/169; 345/173; 348/14.05; 348/114; 348/161

(58) Field of Classification Search .................. 345/158, 345/169, 173; 348/14.05, 114, 161
See application file for complete search history.

(56) References Cited

U.S. PATENT DOCUMENTS

| | | | |
|---|---|---|---|
| 5,453,758 A | 9/1995 | Sato | |
| 5,459,489 A | 10/1995 | Redford | |
| 5,469,194 A | 11/1995 | Clark et al. | |
| 5,652,630 A | 7/1997 | Bertram et al. | |
| 5,774,571 A | 6/1998 | Marshall | |
| 6,346,891 B1 | 2/2002 | Feinleib et al. | |
| 6,396,523 B1 | 5/2002 | Segal et al. | |
| 6,429,543 B1 | 8/2002 | Desai | |
| 6,456,275 B1 | 9/2002 | Hinckley et al. | |
| 6,501,515 B1 | 12/2002 | Iwamura | |
| 6,765,557 B1 | 7/2004 | Segal et al. | |
| 6,831,664 B2 | 12/2004 | Marmaropoulos et al. | |
| 7,619,618 B2 * | 11/2009 | Westerman et al. | 345/173 |
| 7,889,175 B2 * | 2/2011 | Kryze et al. | 345/173 |
| 2003/0156756 A1 | 8/2003 | Gokturk et al. | |
| 2003/0179246 A1 | 9/2003 | Marmaropoulos et al. | |
| 2004/0196270 A1 | 10/2004 | Chiu et al. | |
| 2004/0236699 A1 | 11/2004 | Beenau et al. | |
| 2005/0162402 A1 | 7/2005 | Watanachote | |
| 2005/0185788 A1 | 8/2005 | Daw | |
| 2005/0259086 A1 | 11/2005 | Chiu et al. | |
| 2006/0016868 A1 | 1/2006 | Bonalle et al. | |
| 2006/0077179 A1 | 4/2006 | Hsu et al. | |
| 2006/0197750 A1 | 9/2006 | Kerr et al. | |
| 2006/0227030 A1 | 10/2006 | Clifford et al. | |

* cited by examiner

*Primary Examiner* — Kevin M Nguyen
*Assistant Examiner* — Sepideh Ghafari
(74) *Attorney, Agent, or Firm* — Harness, Dickey & Pierce, P.L.C.

(57) ABSTRACT

Sensors around the periphery of the remote control unit detect contact with the user's hand. A trained model-based pattern classification system analyzes the periphery sensor data and makes a probabilistic prediction of the user's hand size. The hand size is then used to control a mapping system that defines how gestures by the user's thumb upon a touchpad of the remote control unit are mapped to the control region upon a separate display screen.

19 Claims, 7 Drawing Sheets

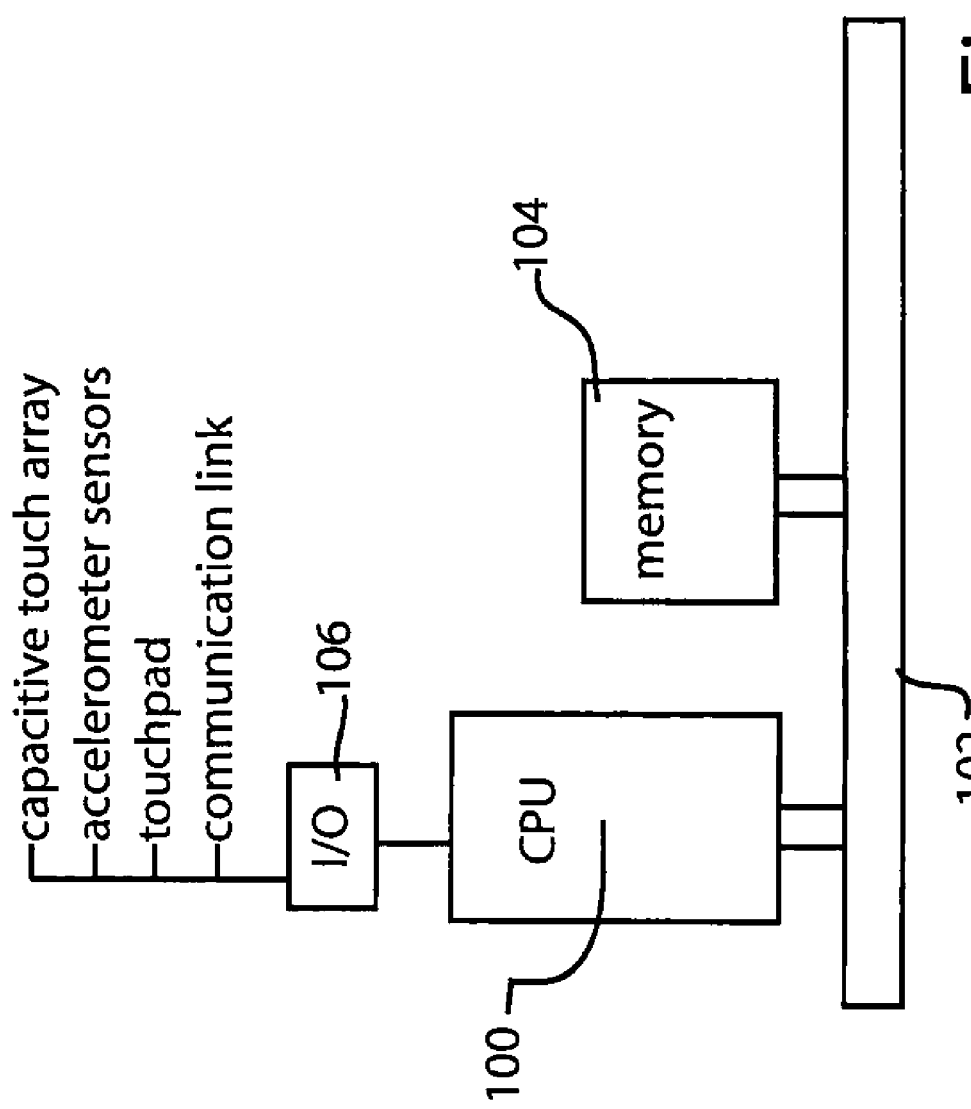

TOUCH SENSITIVE REMOTE CONTROL SYSTEM THAT DETECTS HAND SIZE CHARACTERISTICS OF USER AND ADAPTS MAPPING TO SCREEN DISPLAY

CROSS-REFERENCE TO RELATED APPLICATIONS

This application claims the benefit of U.S. Provisional Application No. 61/046,578, filed on Apr. 21, 2008, the entire disclosure of which is incorporated herein by reference.

BACKGROUND OF THE INVENTION

The present invention relates generally to remote control systems. More particularly, the invention relates to a remote control system, suitable for control of consumer electronic products and home appliances, that includes a touch sensitive handheld remote control unit that detects hand size characteristics of the user and adapts the mapping between the user-touch-sensitive surface(s) and a display screen.

Handheld remote control units, typically featuring a large plurality of push buttons, are now quite commonplace on coffee tables throughout the world. With most consumer electronic products, it is customary for the manufacturer to furnish such a handheld remote control with each unit. Thus, most consumers own a collection of various different remote control units, each associated with a particular product or appliance.

In an effort to simplify matters, the Applicants' assignee has developed several different embodiments of a touch-sensitive remote control unit that features a reduced number of push buttons and one or more touch-sensitive touchpads that may be manipulated by the user's fingers or thumb to interact with information on a display screen. The touch pads may be manipulated, for example, to move a selection indicator (such as a cursor or other graphical element) across a control region upon a display screen. In some applications, the display screen will be separate from the handheld remote control unit, and thus the user manipulates the selection indicator by watching the display screen while manipulating the keypad with a finger or thumb. Preferably, the touchpad or touchpads are disposed on the remote control unit so that they can be manipulated by the user's thumb while the user is holding the unit in one hand.

The human thumb is articulated for generally arcuate movement across a touchpad surface disposed on the face of the remote control unit. By bending at the knuckles, points on the touchpad may be reached that are radially inward from the extended arcuate sweep of the thumb's natural trajectory. Due to these physical constraints of the user's hand and thumb movement, some regions on the touchpad are easier to reach than others. Because each user's hand size and dexterity qualities are different, it becomes quite difficult to design a touch sensitive handheld remote control unit that will physically suit all users.

We have therefore developed a remote control system that detects hand size characteristics of the user and uses this detected information to map points on the touchpad onto points of the display screen to thereby assist the user in making selections on the display screen regardless of the size or geometric configuration of the screen's control region and regardless of the physical limitations of the user's hand and thumb movement geometry.

SUMMARY OF THE INVENTION

This section provides a general summary of the disclosure, and is not a comprehensive disclosure of its full scope or all of its features.

In one presently preferred embodiment, a remote control system for an electronic product having a display screen is provided, where at least a portion of the screen defines a control region within which a user-controlled selection indicator may be visually displayed. In this embodiment, a handheld remote control unit, separate from the display screen, has at least one touchpad disposed for actuation by a user's thumb to effect movement of the selection indicator. The control unit includes a sensor system that is responsive to the user's hand to produce observation signals reflecting characteristics of the user's hand geometry. A trained, model-based pattern classification system ascertains at least one user-specific attribute in response to the observation signals. A mapping system having at least one parameter controlled by the user-specific attribute defines a first reference frame associated with the touchpad. The mapping system defines a second reference frame associated with the display screen. In this embodiment, the second reference frame corresponds to the geometry of the display screen. The mapping system uses the controlled parameter to perform a transformation of touch points by the user's thumb upon the touchpad (expressed in the first reference frame) into points on the display screen (expressed in the second reference frame). In this way, the system assists the user in moving the selection indicator across the display screen control region, regardless of the size or geometric configuration of the control region or of the physical limitations of the user's hand and thumb movement geometry.

For a more complete understand of our innovation, refer to the remaining specification and the accompanying drawings.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 7 is an exemplary microprocessor-based circuit useful for implementing the functionality illustrated in FIGS. 4, 5 and 6.

DESCRIPTION OF THE PREFERRED EMBODIMENTS

Example embodiments will now be described more fully with reference to the accompanying drawings.

Figure 1:
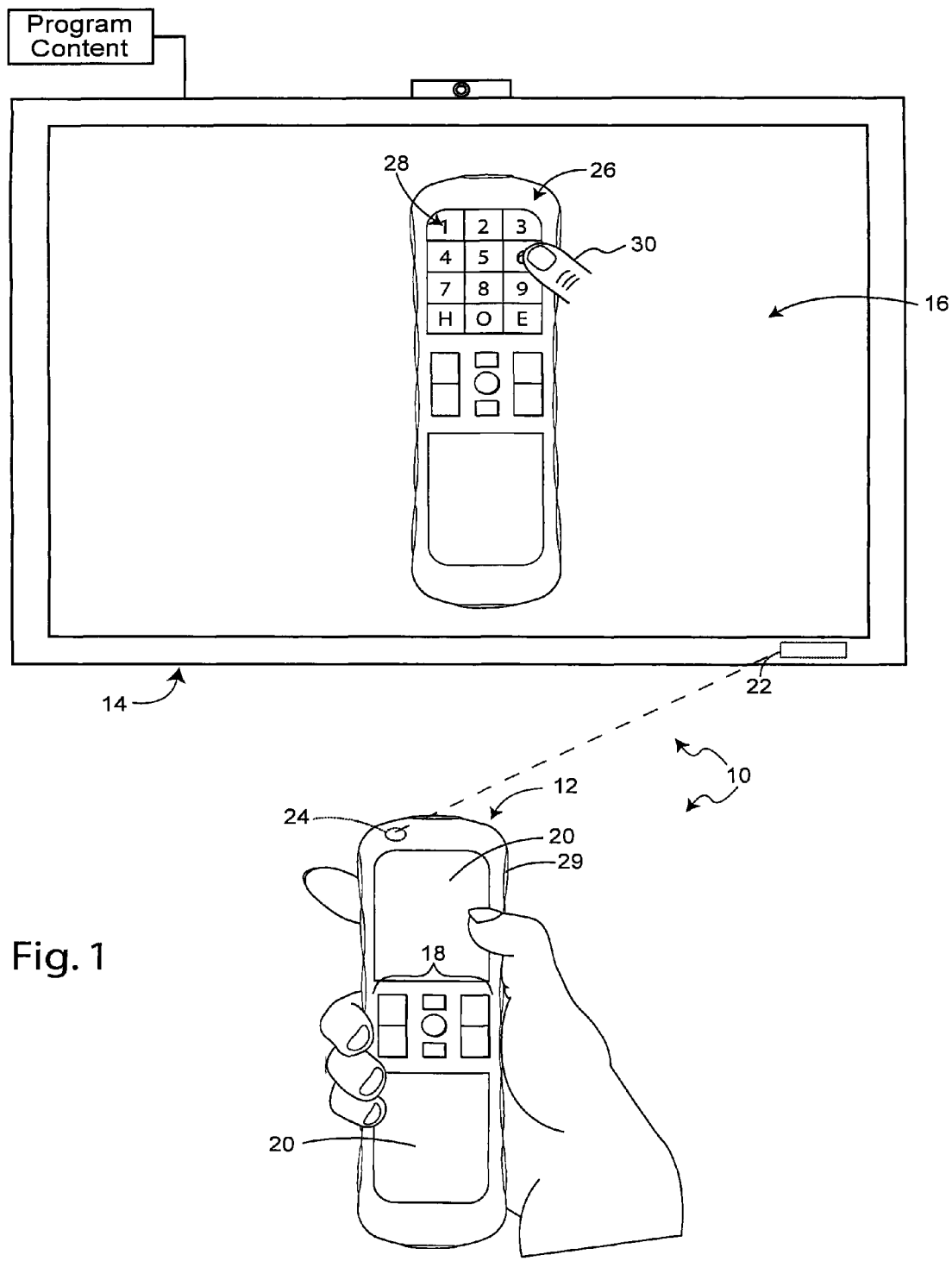
FIG. 1 illustrates an exemplary remote control system for an electronic product having a display screen and having a handheld remote control unit that includes at least one touchpad disposed for actuation by a user's thumb.

Referring to FIG. 1, a remote control system for an exemplary electronic product is illustrated generally at 10. The remote control system includes a handheld remote control unit 12 that sends control instructions, preferably wirelessly, to an electronic product 14 having a display screen 16. The remote control unit 12 includes a complement of push buttons 18 and a pair of touchpads 20. Note that in the illustrated embodiment, the remote control unit is bilaterally symmetrical so that it will function in the same way regardless of which touchpad is proximate the user's thumb. The handheld remote control unit 12 has an orientation sensor (not shown) to detect in what orientation the unit is being held.

Any type of communication interface between the handheld remote control unit and the electronic product can be utilized. For purposes of illustration, a wireless transmitting device, shown diagrammatically at 24 and a wireless receiving device, show diagrammatically at 22, are illustrated. It will be appreciated that wireless communication can be accomplished using infrared, ultrasonic and radio frequencies, and further utilizing a variety of different communication protocols, including infrared communication protocols, Bluetooth, WiFi, and the like. Communication can be unilateral (from remote control unit 12 to electronic product 14) or bilateral.

In the illustrated embodiment, a control region is defined on the screen, within which a user-controlled selection indicator may be visually displayed. In FIG. 1, a visual facsimile of the remote control unit itself, is displayed on a display screen 16 as at 26. A user-controlled selection indicator, in the form of a graphical depiction of the user's thumb 30 is displayed. Movement of the user's thumb upon touchpad 20 causes corresponding movement of the selection indicator 30. Although similar to movement of a computer screen cursor by track pad, there is this difference. Regions on the touchpad 20 are mapped one-to-one onto the control region of the screen. The typical computer track pad does not employ such one-to-one relationship, but rather it uses a relative mapping to mimic performance of a computer mouse which can be lifted and then repositioned.

Figure 2A:
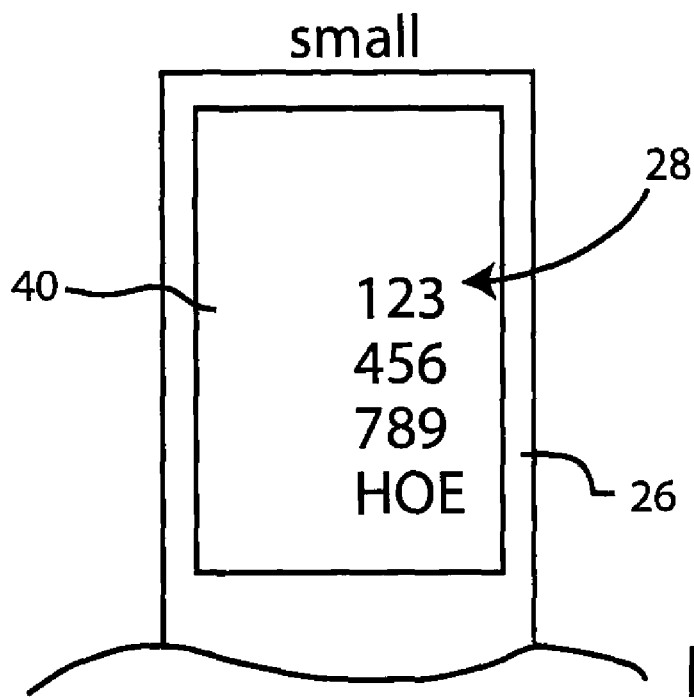
FIGS. 2A and 2B are exemplary views of a touchpad surface, useful in understanding how a user's hand size can affect usability of the touchpad surface.
Figure 2B:
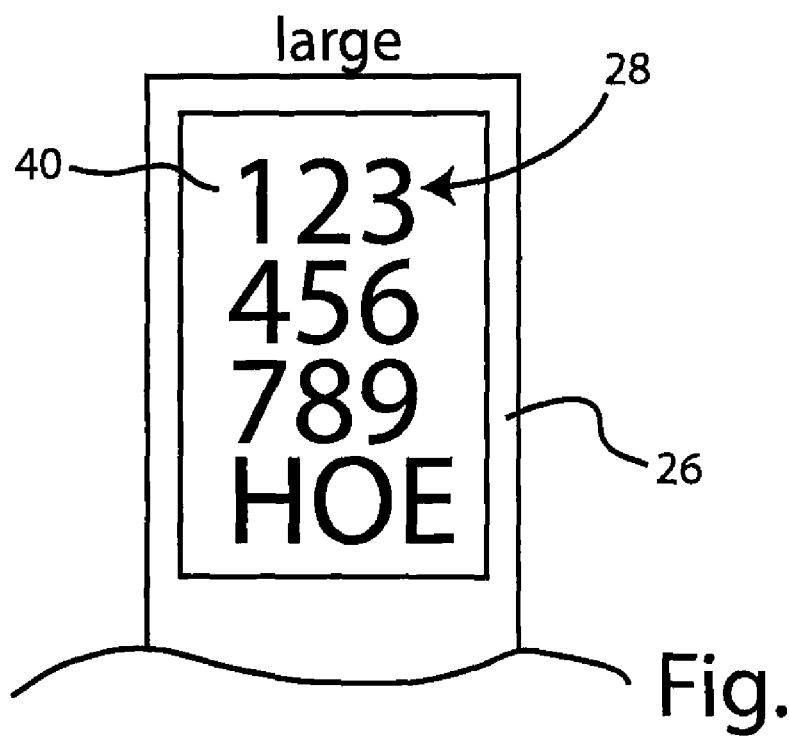

Although the illustrated embodiment uses a one-to-one mapping between the touchpad surface and the control region, this mapping is altered to accommodate the hand size characteristics of the user. Referring to FIGS. 2A and 2B, an exemplary pattern of numbers and letters have been illustrated on the touchpad, in the mapped positions where they would be most easily accessible to a person with a small hand (FIG. 2A) and a large hand (FIG. 2B). Compare these mapped locations with the corresponding locations on the control region 26 (FIG. 1). Although the image displayed on the screen (FIG. 1) would remain the same for all users, regardless of hand size, the portion of the touchpad that actually maps to the control region is adjusted. Thus, the user with small hand does not have to reach as far to select numeral 1. Conversely, the user with large hand will find it easier to select numeral 5 without simultaneously selecting an adjacent numeral, such as numeral 4. In effect, only a portion of the touchpad is used when the hand is small (FIG. 2A) and this portion is then scaled up to match the entire control region shown on the display screen.

As FIGS. 2A and 2B have illustrated, the system can adapt how regions on the track pad are mapped onto control regions of the screen based on the user's hand size. In FIGS. 2A and 2B, a simple scaling transformation was performed. The transformation involves defining a first reference frame associated with the touchpad and a second reference frame associated with the control region of the display screen. In this case, each of the reference frames may be represented using a Cartesian coordinate system (x-y). A scaling factor may be applied to each of the x and y dimensions, to effect a one-to-one mapping between the two reference frames. The scaling factor can be the same for both x and y coordinates, or they may be different.

Although mapping between two Cartesian coordinate systems is perhaps easiest to understand, and the least computationally expensive, other coordinate systems can be used. For example, a polar coordinate system might be chosen $(r, \theta)$ to represent points on the touchpad. Such a polar coordinate system may more naturally fit the trajectory of the human thumb which most easily makes sweeping motions in an arcuate trajectory.

Regardless of the coordinate systems chosen, the remote control system is designed to perform a mapping between the one system and the other, to adapt to the user's hand size and dexterity characteristics. As will be more fully explained, the system is capable of analyzing each individual user's hand size and even the available range of thumb movements, so that an optimal mapping can be chosen for each user. Users with small hands do not need to struggle to reach the far corners of the touchpad; users with large hands do not need to fumble making minute selections; and persons with physical handicaps can still use the device because inaccessible regions will no longer be mapped to portions of the screen control region.

Figure 3:
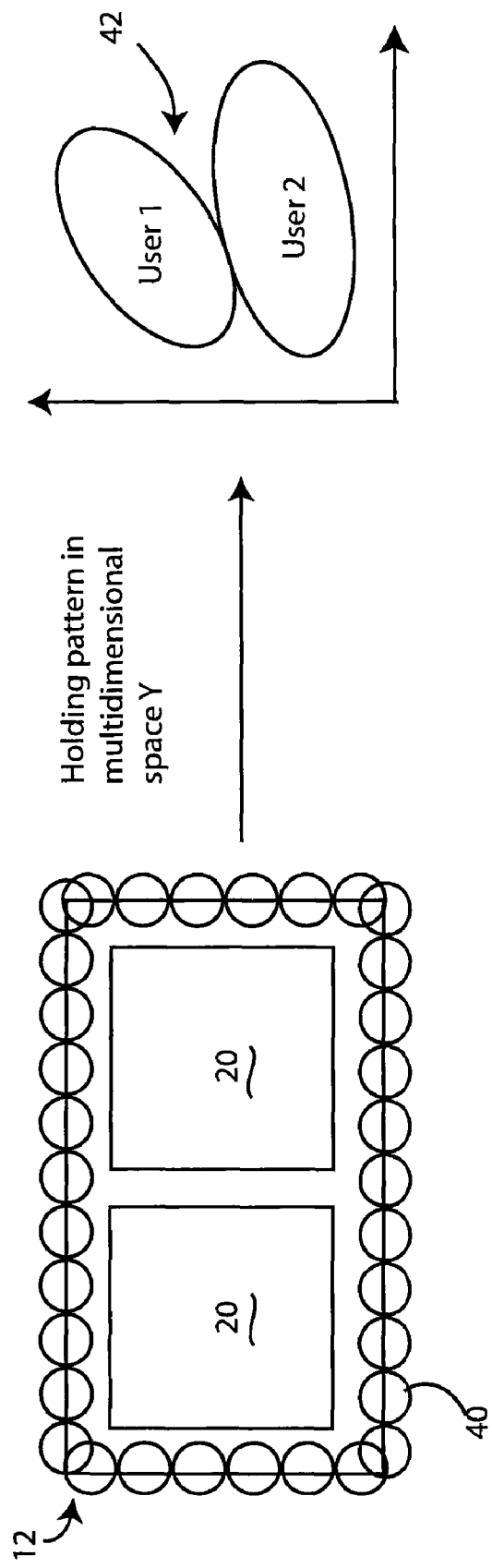
FIG. 3 is a schematic representation of a remote control unit having plural touchpads and an array of capacitive sensors about the periphery of the remote control unit, and further illustrating that different users will have different thumb trajectory patterns that are dependent upon the geometry and dexterity of the user's hand and thumb.

The remote control system uses a powerful classification system for detecting the user's identification, hand size and remote control unit holding position. In one presently preferred embodiment, hand size and hand characteristics are measured using a high resolution capacitive touch array that is disposed around the periphery of the remote control unit. Referring to FIG. 3, the remote control unit 12 is diagrammatically depicted at 12 with two touchpads 20. The capacitive touch array is depicted at 40.

When grasped in the user's hand, some of the individual elements of the array are activated (those in close proximity to the touching portions of the user's hand). This holding pattern gives some measure of the user's identity, and size and holding position. Of course, no user will hold the remote control unit in exactly the same way each time he or she picks it up. Thus, each user's touch array observation data can be expected to vary from use to use and even from moment to moment. Thus, a presently preferred embodiment uses a model-based pattern classification system to convert the holding pattern observation data into user identification, hand size and holding position information. Then, once the user's identity or at least the user's hand size has been ascertained, then the predicted range of movement of the user's thumb can be determined and used along with hand size information to control how the mapping is effected. FIG. 3 illustrates at 42 how two different users may have different hand size and holding position characteristics.

Figure 4:
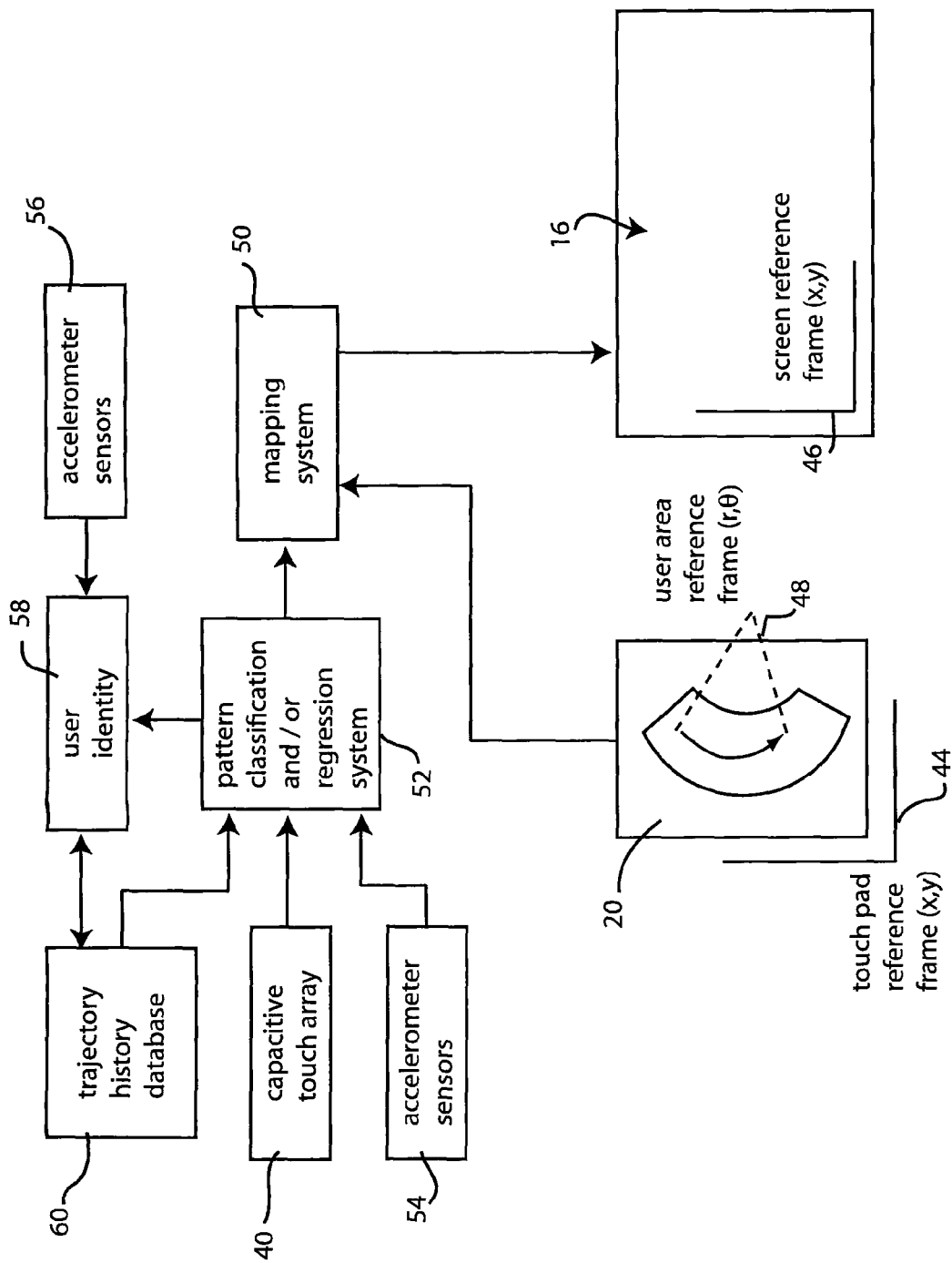
FIG. 4 is a block diagram illustrating a preferred embodiment of a remote control system employing pattern classification and/or regression system to decode sensor information and provide control parameters to a mapping system.

Now that the basic concepts of the remote control system have been introduced, refer to FIG. 4 for a more detailed explanation of a further preferred embodiment. In FIG. 4, the touchpad 20 and display screen 16 have been diagrammatically illustrated. Associated with the touchpad is a first reference frame 44. Associated with the screen is a second reference frame 46. Reference frames 44 and 46 have been illustrated as Cartesian (x, y) reference frames. For completeness, a third reference frame, designated as user area reference frame 48 has been illustrated. This is a polar coordinate reference frame that may be useful in describing the trajectory of the user's thumb in making sweeping arcuate movements across the touchpad surface.

The mapping system 50 performs the transformation of points by the user's thumb upon the touchpad 20 (expressed in either the first reference frame 44 or user reference frame 48) into points on the display screen 16 (expressed in the second reference frame 46). Transformations from Cartesian reference frame to Cartesian reference frame, such as reference frames 44 and 46, can be effected by applying a linear transformation or scaling factor in one or both of the x and y dimensions. Transformation from the polar coordinate system to the Cartesian coordinate system may also require trigonometric conversion.

Mapping system 50 is designed to be controlled by the pattern classification and/or regression system 52. The pattern classification and/or regression system 52 operates upon data received from the capacitive touch array (and potentially other inputs) to ascertain at least one user-specific attribute in response to observation signals received from the capacitive touch array 40 (and optionally other inputs). The pattern classification and/or regression system 52 then generates at least one control parameter that establishes how the mapping system 50 does its job. The details of the pattern classification and/or regression system will be explained in further detail below in connection with FIG. 5.

Before proceeding with that explanation, some additional details and optional features are worth mentioning here. While the capacitive touch array 40 provides a key input in this presently preferred embodiment, other information can also be used by the pattern classification and/or regression system 52. For example, the remote control unit may be outfitted with one or more accelerometer sensors 54 that detect motion of the remote control unit. In some cases, lift off of the remote control unit (as the user picks up the remote control unit) may be consistent enough for a specific user that it could serve as useful information in determining the user's identity. Thus, data from these accelerometer sensors 54 may be optionally supplied to the pattern classification and/or regression system 52 where this determination is made.

Alternatively, accelerometer sensors shown separately at 56 (although they may be the same physical sensors as those depicted at 54) may sense physical movement of the remote control unit that has been previously learned by the system (through training) as corresponding to a particular user. In this case, a specific movement of the remote control unit (such as a specific up-down left-right gesture) would serve as an explicit log-in gesture. A user identity module 58, receptive of these accelerometer sensor signals, performs a correlation between the detective motion and a previously stored user identity. If desired, the pattern classification and/or regression system can additionally supply user identity information to module 58 as a means of increasing the reliability of the user identity operation performed by this module.

Further, if desired, a trajectory history database 60 may be included to store information about each user's thumb trajectory patterns observed during prior uses of the remote controlled unit. For example, when the user picks up the remote control unit and starts to use it, the thumb motion patterns observed can be treated as gestural "sentences" that have measurable attributes, including the velocity and acceleration patterns of thumb movement and the physical extents (boundaries) that the particular movement covered upon the touchpad surface. All of this trajectory data can be analyzed and stored in the trajectory history database, either as raw data or as parametric data generated from the raw data. By storing the trajectory history data in association with each user, the database can then later be queried to ascertain the identity of the user based on observed current trajectory patterns. Thus, the identity of the user as ascertained by the trajectory history database can be supplied to the pattern classification and/or regression system, and also to the user identity module 58, if desired.

Figure 5:
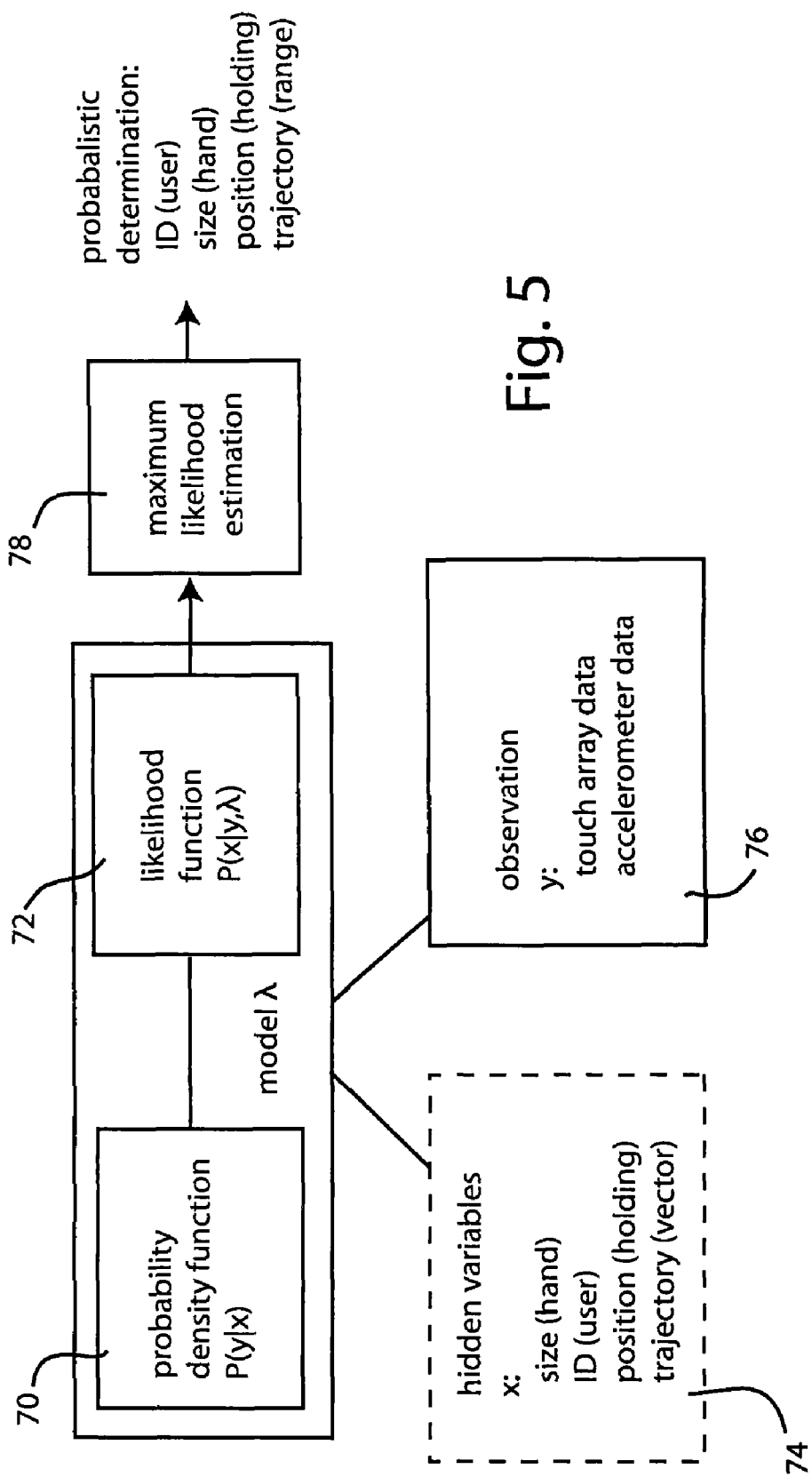
FIG. 5 is a block diagram illustrating in greater detail one embodiment of a pattern classification system.

The pattern classification and/or regression system 52 may be implemented using a trained model-based system. FIG. 5 illustrates some of the concepts which underlie the pattern classification system. The basic idea is that the holding pattern, as observed by the capacitive touch array, will be affected by three main phenomena:

(1) User identification
(2) Hand size (partially related to user identification)
(3) Holding position To detect hand size we need to resolve the above three main unknowns jointly. For that purpose, a preferred embodiment uses a source/channel model based on position and hand size. These three unknowns represent "hidden variables" which we shall designate as x={size, ID, position}. We represent the observed variable in the multi-dimensional space of touch sensors of Y (the observation data) and we assume a parametric model $\lambda$ of the transmission channel. The maximum likelihood estimation (MLE) based on the source channel model can then be computed as illustrated in FIG. 5 and as set forth below:

$$P(y|x) \rightarrow x = \arg\max P(x|y, \lambda)$$

In FIG. 5, the probability density function specifies the probability of observing data y given the parameter x. From this, the likelihood function may be defined by reversing the roles of the data vector y and the parameter vector x given the parametric model $\lambda$. As diagrammatically illustrated, the model is designed to embed hidden variables 74 x (representing hand size, user ID, holding position, and potentially other factors such as trajectory vectors), and to access those hidden variables through observation data 76, which observation data includes capacitive touch array data and optionally accelerometer data. As illustrated at 78, maximum likelihood estimation is used to make a probabilistic determination of the hidden variables based on the observation data and given the model $\lambda$.

In order to obtain an estimation of the likelihood function, we collect a representative set of training samples over variations of x. This means different users having different hand sizes and holding the remote control unit in different positions supply training data that are then used to construct the model. In this regard, different parametric forms of the likelihood function can be used. These include vector quantization (VQ) models, which can be used for the discrete case, and Gaussian Mixture Models for the continuous case. In this regard, the solution of the maximum likelihood estimation will yield discrete values of x. This is useful for making user identification decisions. In order to obtain continuous values of holding position or hand size, a local regression analysis may also be employed. The continuous solution would be useful, for example, in making holding position and/or hand size determinations in units of physical measure, such as millimeters.

Figure 6:
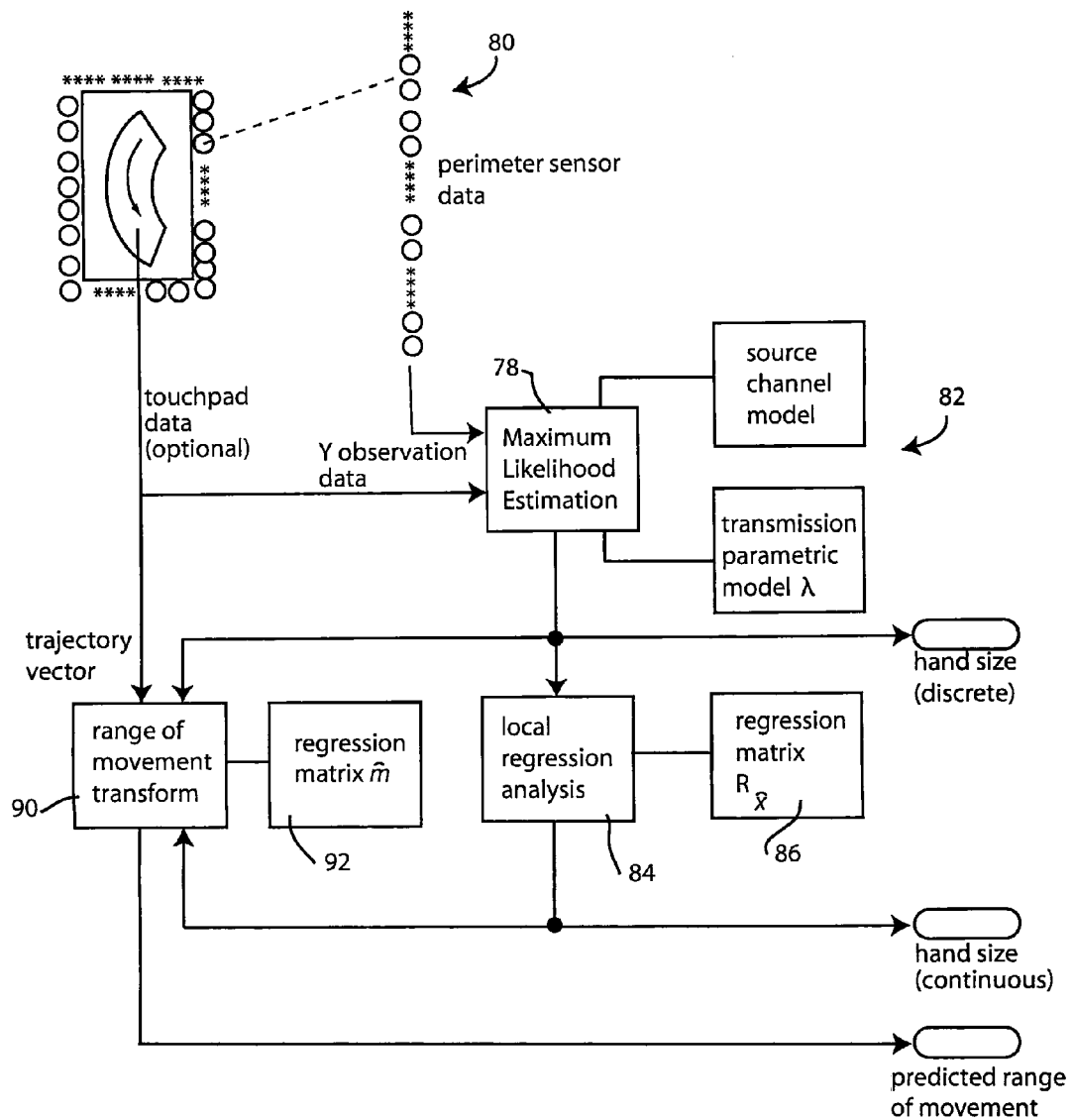
FIG. 6 is a process flow diagram illustrating one embodiment of a process to decode sensor data in determining the user's hand size and predicted range of movement.

Referring now to FIG. 6, we show the perimeter sensor data at 80 being fed to the maximum likelihood estimation block 78 which processes this observation data using the trained model $\lambda$, depicted at 82. The result of this maximum likelihood estimation is a discrete determination of hand size (a probabilistic determination corresponding to the most likely one of the users). In a continuous hand size determination (i.e., a measure of hand size according to a physical measure), some additional processing is employed. Specifically, local regression analysis is performed at 84 using a regression matrix 86 previously trained. In this regard, larger hands will tend to fire-up more capacitive touch array sensors, thus a continuous measure of hand size can be approximated using a locally linear multi-dimensional regression analysis (MRA). In this case, the relationship between the touch points and the hand size is assumed to be locally linear (sometimes referred to as piecewise linear) after solution of the maximum likelihood estimation. This linear relationship between hand size and sensor pattern may be expressed by the following equation where s is size and R is the regression matrix parameterized by the discrete estimated x):

$$S=Rx^*y$$

In the above equation, the regression matrix is trained using different samples from different hand sizes and different holding patterns as initially estimated by the maximum likelihood estimation block. Alternatively, a more reliable, but more complex, soft estimate may be taken based on the following expectation:

$$S=Ex\{R_{xy}\}=\int dx.P(x|y,\tilde{e})R_{xy}$$

It should also be noted that the current estimation method can also be used in conjunction with data from two touchpads, to thereby detect hand size and position and also to adjust the range of operation of the user interface (thus optionally mapping only selected portions of the touchpad that the user is able to comfortably reach). For this additional functionality, we include a vector of trajectories over the main touchpad in the set of hidden variables represented by the vector x. Based on the estimated size of the hand we can again compute a transformation to detect the range of movement using regression analysis. Thus, in block 90 (FIG. 6) trajectory vector information is supplied from the touchpad and the regression matrix 92 is used. The range of movement transformation receives continuous hand size information from the local regression analysis block 84. Alternatively, discrete hand size information from maximum likelihood estimation block 78 may be used. In this operation, we make the assumption that the range of movement and size of the hand are directly correlated and can be regressed by means of a single regression matrix as in:

$$M=R_s=R\cdot E_x\{R_{xy}\}$$

Finally, we can solve the reverse problem to optimize the capacitive touch array sensors, in order to maximize the performance of the estimation algorithm. To do that, we start with a high resolution spatial sampling of the space X, and collect data over several users. We then apply the current estimation technique to derive the estimate of x. Finally, we apply vector quantization over the discrete points of X in order to merge redundant touch points while conserving high estimation accuracy. To respect topological constraints (two nonadjacent sensors cannot be merged and considered as one) we need to use a greedy algorithm that considers merging neighboring sensors based on a minimum loss of objective function.

In one embodiment the functionality provided by the modules illustrated in FIGS. 4, 5 and 6 may be implemented by microprocessor circuitry located within the remote control unit itself. See FIG. 7. Alternatively, one or more of the functions represented by the modules illustrated in FIGS. 4, 5 and 6 may be implemented by similar microprocessor circuitry located within the electronic product being controlled (e.g., product 14 of FIG. 1).

Referring to FIG. 7, the microprocessor CPU 100 is coupled via bus 102 to the memory 104 into which the operating instructions to implement the illustrated functions are stored. Memory 104 also stores the data used to represent the trained models as well as the data used in computing the resulting probabilities and providing the control signals that ultimately control the electronic product being controlled. An input/output (I/O) interface is coupled to the CPU to provide an input/output interface to the various sensors used by the system and to provide the interface to the communication link by which the remote control unit communicates with the electronic product.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A remote control system for an electronic product having a display screen where at least a portion of that screen defines a control region within which a user-controlled selection indicator may be visually displayed, a handheld remote control unit separate from said display screen and having at least one touchpad disposed for actuation by a user's thumb to effect movement of said selection indicator;

a sensor system carried by said control unit and responsive to the user's hand to produce observation signals reflecting characteristics of the user's hand geometry;

trained model-based pattern classification system that ascertains at least one user-specific attribute in response to said observation signals;

mapping system having at least one parameter controlled by said at least one user-specific attribute;

said mapping system defining a first reference frame associated with said at least one touchpad and defining a second reference frame associated with and corresponding to the geometry of the display screen;

said mapping system using said at least one parameter to perform a transformation of touch points by the user's thumb upon the at least one touchpad expressed in the first reference frame into points on the display screen expressed in the second reference frame, thereby assisting the user in moving the selection indicator across the display screen control region regardless of its size or geometric configuration of the control region or of the physical limitations of the user's hand and thumb movement geometry.

2. The remote control of claim 1 wherein said sensor system includes an array of sensors disposed about the periphery of the control unit and being responsive to sense and produce gripping pattern observation signals indicative of gripping patterns by the user's hand when holding the control unit.

3. The remote control of claim 2 wherein the array of sensors comprises capacitive sensors responsive to points of contact by the user's hand.

4. The remote control of claim 1 wherein said sensor system includes at least one acceleration sensor providing inertial observation signals in response to motion of the control unit by the user's hand.

5. The remote control system of claim 1 wherein said sensor system includes thumb motion trajectory sensor providing trajectory observation signals.

6. The remote control system of claim 1 wherein the classification system employs maximum likelihood estimation to ascertain an indication of the user's hand size based on said observation signals.

7. The remote control system of claim 1 wherein the classification system employs regression analysis to ascertain an indication of the user's hand size based on said observation signals.

8. The remote control system of claim 1 wherein the classification system employs maximum likelihood estimation to ascertain a discrete indication of the user's hand size based on said observation signals and employs regression analysis to ascertain a continuous indication of the user's hand size based on said observation signals.

9. The remote control system of claim 1 wherein the classification system generates an estimation of the user's hand size.

10. The remote control system of claim 9 further comprising a range of movement transformation module that uses trajectory vector information from said touchpad and the estimation of the user's hand size to ascertain a predicted range of movement of the user's thumb.

11. The remote control system of claim 1 wherein said mapping system transforms points within the first reference frame into points within the second reference frame by applying a linear transformation.

12. The remote control system of claim 1 wherein said mapping system transforms points within the first reference frame into points within the second reference frame by applying a Cartesian to polar transformation.

13. The remote control system of claim 1 further comprising trajectory history database that stores information about a user's thumb trajectory patterns observed during use of the remote control unit.

14. The remote control system of claim 13 wherein said trajectory history database communicates with the classification system to supply information about the user from which the user's identity is ascertained.

15. The remote control system of claim 13 wherein said trajectory history database stores parametric data generated from the trajectory patterns observed.

16. The remote control system of claim 1 wherein said trained model-based pattern classification system and mapping system are implemented using a CPU disposed within the handheld remote control unit.

17. The remote control system of claim 1 wherein said trained model-based pattern classification system and mapping system are at least partially implemented using a CPU disposed within the handheld remote control unit.

18. The remote control system of claim 1 wherein said trained model-based pattern classification system and mapping system are at least partially implemented using a electronic components disposed within said electronic product.

19. A method of controlling an electronic product with a handheld remote control unit, comprising:
   sensing contact between a user's hand and the remote control unit to derive an observation signal;
   submitting said observation signal to a trained model-based pattern classification system that ascertains at least one user-specific attribute;
   using said user-specific attribute to control a mapping system that performs transformations between a control surface reference frame associated with the remote control unit and another reference frame that differs from the control surface reference frame;
   using said mapping system to transform gestural contact with a surface of the remote control unit by the user's hand into control instructions that are sent to the electronic product to effect control thereof.

* * * * *